No. 870,598. PATENTED NOV. 12, 1907.
B. W. TUCKER.
MALT STIRRING APPARATUS.
APPLICATION FILED APR. 16, 1907.

Witnesses:
L. Lee.
J. W. Greenbaum

Inventor.
Benjamin W. Tucker
per Thomas S. Crane, Atty.

No. 870,598. PATENTED NOV. 12, 1907.
B. W. TUCKER.
MALT STIRRING APPARATUS.
APPLICATION FILED APR. 16, 1907.

Witnesses:
L. Lee
J. W. Greenbaum

Inventor.
Benjamin W. Tucker,
per Thomas S. Crane, Atty.

No. 870,598. PATENTED NOV. 12, 1907.
B. W. TUCKER.
MALT STIRRING APPARATUS.
APPLICATION FILED APR. 16, 1907.

No. 870,598. PATENTED NOV. 12, 1907.
B. W. TUCKER.
MALT STIRRING APPARATUS.
APPLICATION FILED APR. 16, 1907.

UNITED STATES PATENT OFFICE.

BENJAMIN W. TUCKER, OF NEWARK, NEW JERSEY, ASSIGNOR TO CHARLES H. UNVERZAGT, OF NEW YORK, N. Y.

MALT-STIRRING APPARATUS.

No. 870,598.      Specification of Letters Patent.      Patented Nov. 12, 1907.

Application filed April 16, 1907. Serial No. 368,590.

*To all whom it may concern:*

Be it known that I, BENJAMIN W. TUCKER, a citizen of the United States, of 784 Highland avenue, Newark, county of Essex, and State of New Jersey, have invented certain new and useful Improvements in Malt-Stirring Apparatus, fully described and represented in the following specification and the accompanying drawings, forming a part of the same.

The object of the present invention is to furnish an automatic mechanism for turning the grain upon a malting floor and conveying it therefrom when malted, and the invention comprises a carriage with a reversible grain-turning cylinder thereon and reversible vanes and valve-plates pivoted upon the cylinder, with means for traversing the cylinder back and forth over the malting alley and reversing the motion of the cylinder and the position of the vanes automatically at the opposite ends of the alley.

The invention includes the means when the stirring of the grain is completed, for automatically discharging the grain through the agency of the cylinder and an interior conveyer to an adjacent alley or to a channel from which the grain may be discharged to any desired point.

Where a plurality of malting alleys can be operated side by side, the invention furnishes a means, through a movable cradle mounted upon a transverse track at the ends of the alleys, for receiving the carriage from any of the alleys and transporting it to another alley, so that the grain-turning device may be kept constantly in use.

The invention will be understood by reference to the annexed drawing, in which

Fig. 3 is an end view of the carriage and turning-cylinder.

Figure 1:
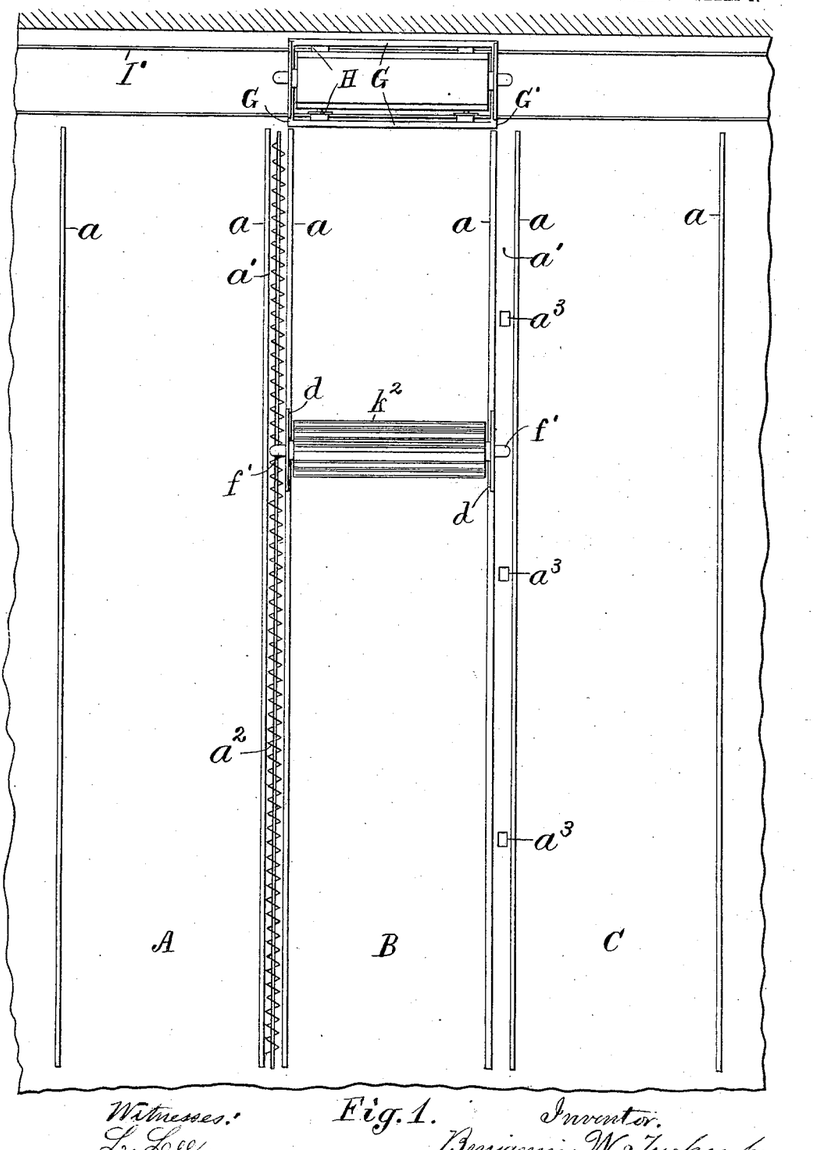
Figure 1 is a plan of three malting alleys upon the same floor with the carriage upon one of such alleys and a cradle at the end of the alley for transporting the carriage to one of the other alleys.

In Fig. 1, A, B, C, designate three malting alleys each having retaining walls $a$ at its opposite sides to hold the grain therein. A channel $a'$ is shown between the adjacent alleys. The top of each wall is provided with rail $b$ to receive the truck-wheels $c$ of the cylinder-carriage, which is formed with frames $d$ connected by tie-bars or beams $e$. The beams carry a trough $f$, the ends of which extend over the channels $a'$, and the beams also carry a series of disks $g$, $g'$, to which annular heads $h$ upon the cylinder are fitted movably, such heads having wheels $i$ fitted to contact with the edges of the disks, and such edges being rabbeted, and flanges $h'$ upon the heads fitted movably to such rabbets to prevent longitudinal movement. Vane-shafts $j$ are extended through and between the heads near their periphery, and vanes formed with ends $k$ and quadrantal shell $k'$ are attached to such shafts. A slotted rocker-arm $l$ is attached to the end of each vane-shaft, and a ring-gear $m$ is fitted to the head $h$ adjacent to such arms and provided with a series of studs $n$ to engage the slots in the arms. The turning of such ring upon the head as hereinafter described, operates to turn the shells of the vanes from their left hand position, shown in full lines in Fig. 3, to the right hand position indicated by the dotted line $k^2$ in Fig. 3; the arms $l$ then assuming a reverse position to that shown in Fig. 3, as indicated in the dotted lines $l'$ for one of the arms, adjacent to the dotted vane $k^2$.

Figure 3:
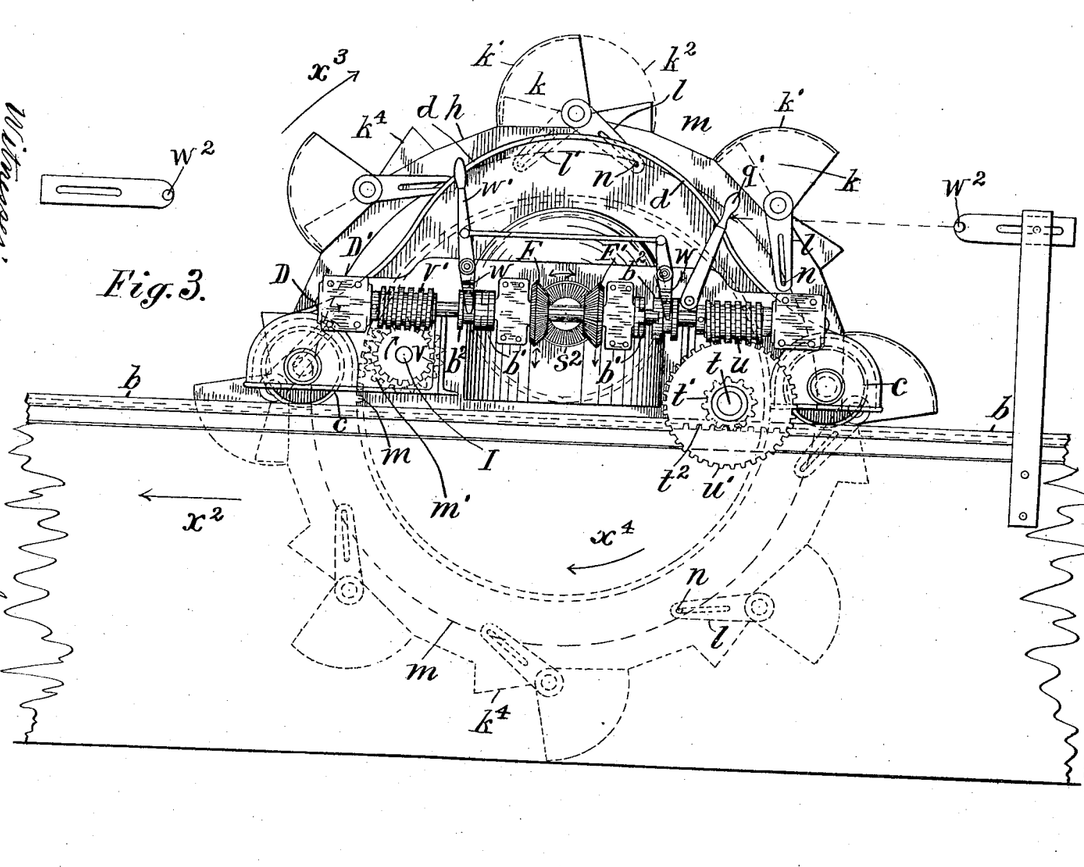
Figure 4:
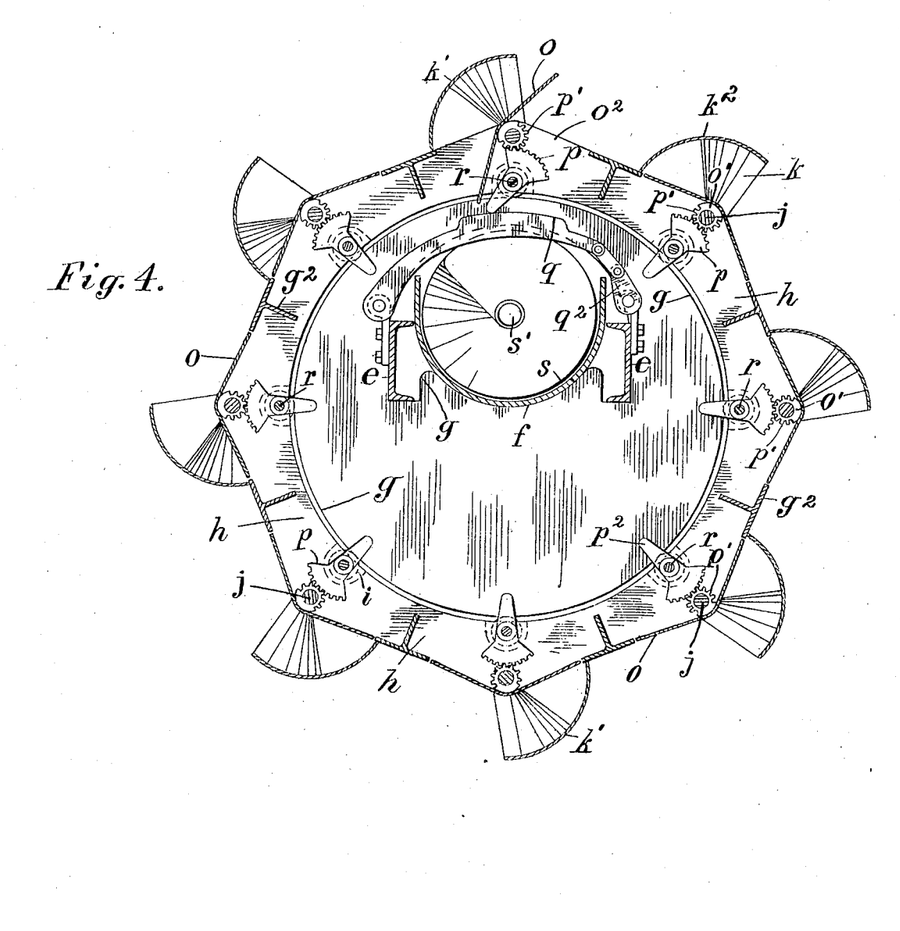
Fig. 4 is a cross section of the turning-cylinder taken on line 4—4 in Fig. 2.
Figure 9:
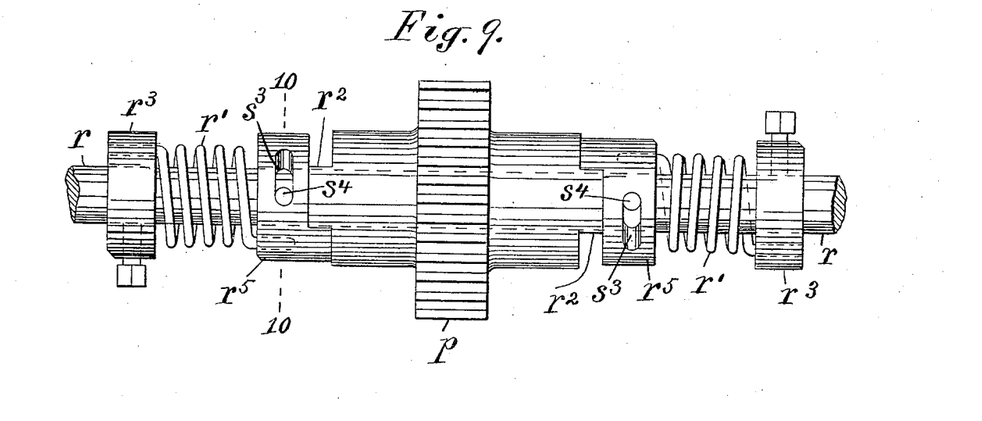
Fig. 9 is a plan of the valve-plate turning mechanism.
Figures 10, 11, 12:
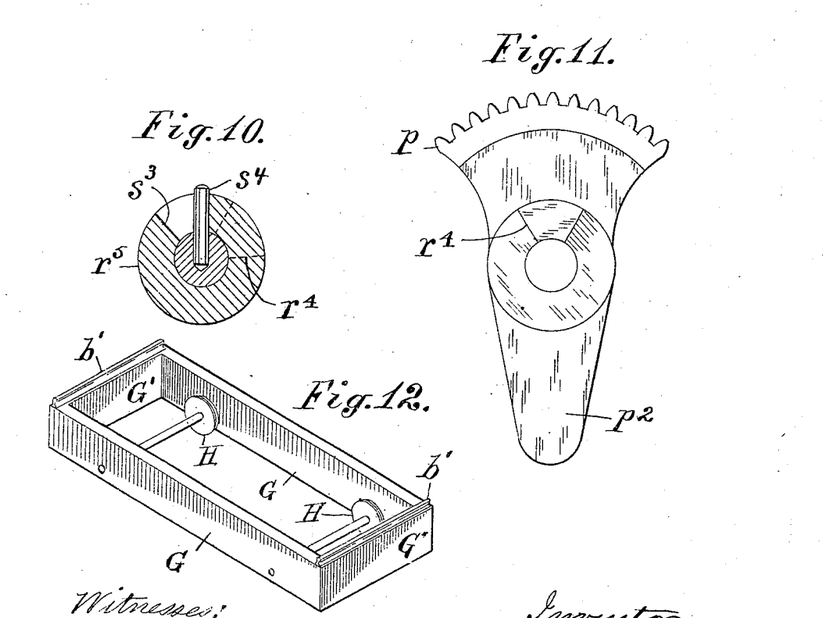
Fig. 10 is a section on line 10—10 in Fig. 9.
Fig. 11 is a side view of the hub of the segment $p$.
Fig. 12 is a perspective view of the transfer cradle.

The forward edge of each vane, when in operation, lies directly outside of the vane-shaft, as shown in Fig. 4, the opposite edge of its quadrantal shell touching the periphery of the head $h$, and a valve-plate $o$ is shown journaled upon each vane-shaft by hub $o'$ and is adapted to close the space $o^2$ between the vane-shaft and the inner edge of the vane, when it is desired to retain the grain within the vane. Such position of the valve-plates $o$ is shown upon all of the vanes in Fig. 4, excepting the upper one, in which the plate is turned to open the inner end of the vane-space $o^2$, which then stands directly over the trough $f$; so that the contents of the vane is discharged by gravity into the trough. Such turning of the valve-plate is effected, when the vane reaches its uppermost position, by toothed segments $p$ mounted to turn upon shafts $r$ which serve as tie-bars between the heads $h$, such segments engaging pinions $p'$ upon the hubs $o'$, and tail-pieces $p^2$ projected from the toothed segments to engage a cam $q$ which is movable into the path of the cranks by a hand-lever $q'$. The tie-bars $r$ are immovable in the heads $h$ and the segments turn thereon and are held normally in a central position thereon by springs $r'$ strained in opposite directions and each attached at one end by a collar $r^3$ to the tie-bar, and having at its other end a collar $r^5$ provided with a lug $r^4$ to engage a tooth $r^2$ upon the hub of the segment $p$ as shown in Figs. 9 to 11. Each collar $r^5$ has a slot $s^3$ fitted to a pin $s^4$ upon the shaft $r$ the pins holding the collars $r^5$ with the lugs $r^4$ in contact with opposite sides of the tooth $r^2$ so as to hold the segment normally in a central position, which is indicated for all of the segments and the valve-plates, except the upper one in Fig. 4. The slot $s$ in either collar $r^5$ permits the segment tooth to rotate the collar when the segment is moved. Pressure upon the cranks $p^2$ in either direction turns the segment in opposition to one of the springs $r'$, such spring restoring the segment to its central position as soon as the crank has passed off of the cam $q$, and carrying the segment to the central position, by the contact of the stop-pin $s^4$ with the end of the slot $s^3$. When the crank $q^2$ is in the position shown in Fig. 4, it holds the cam $q$ in the path of the tail-pieces $p^2$, and the cam-face is of just sufficient length to shift each of the vane-plates and open the vane-space while the vane is moving over the trough $f$. When the hand-lever $q'$ is turned to the left from the position shown in Fig. 3, it lowers the cam $q$ from the path of the cranks $p^2$ and permits the cylinder to revolve continuously with all the valve-plates closed, so as to pick up the grain and spill it upon the opposite side of the cylinder.

Figure 2:
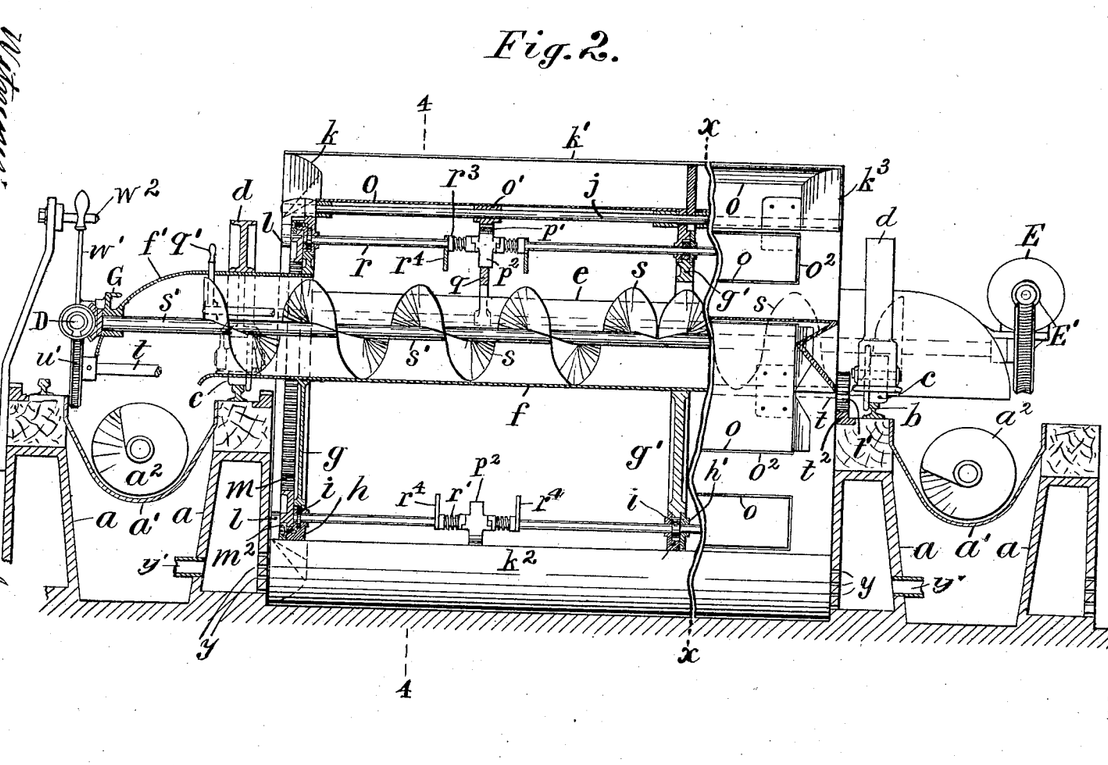
Fig. 2 is an end elevation of one of the alleys with the cylinder and its carriage in section at one side of the broken line $x$—$x$.

In Fig. 2, bearings $r^4$ are shown upon the tie-bars $r$ adjacent to the collars $r^3$, and such bearings are in practice mounted by means of two legs upon the beams $e$ at the opposite sides of the trough $f$; but the legs which support these bearings upon the beams $e$ are not shown in the drawings, as they would confuse other parts. The relation of the bearings to the beams is, however, apparent by inspection of Fig. 4, where the tie-bar $r$ appears above the middle of the trough, as the legs of the bearings would straddle over the top of the conveyer $s$ in a manner similar to that in which the cam $q$ is arched over the top of the trough, while its connections extend to both of the beams $e$.

In the design of turning-cylinder shown, one of the disks $g$ is required at each end of the cylinder and a disk $g'$ at the middle thereof, and Fig. 2 shows the cylinder shortened by breaking out a portion adjacent to the middle disk, it being understood that the length of the cylinder, which is not shown in section at the right hand side of such center disk, would be the same as the length which is shown in section at the left hand side of the center disk. The rotary motion of the turning-cylinder is reversed at each end of the malting alley and the cranks $p^2$ thus engage the cam $q$ from the opposite ends of the cam, when the cylinder rotates in opposite directions; but the vanes are also reversed at each end of the malting alley, and the reverse operation of the segments thus opens the bottom of the vane-space equally when the cylinder turns in either direction.

The means for turning and propelling the turning-cylinder is so constructed that it may automatically reverse the rotations of the cylinder at the ends of the malting alley, and simultaneously reverse the position of the vanes, the ordinary operation of turning the grain requiring the bottoms of the vanes to be held closed continuously so that the grain may be lifted over the cylinder and deposited upon the other side.

When the grain has been fully malted, the hand-lever $q'$ is moved as shown in Fig. 4, to lift the cam $q$, and all of the grain lifted by the cylinder is thereafter deposited in the trough $f$ and delivered to the channels $a'$. These channels are provided with conveyers $a^2$ for moving the grain longitudinally therein, and openings $a^3$ are shown in the bottoms of the channels in Fig. 1, through which the malted grain may be delivered to any apartment or bin, as may be desired.

The spiral blades of the conveyer $s$ are shown inclined in opposite directions from the middle line of the trough, as in Fig. 2, so that the grain as it falls into the trough is discharged equally toward both ends of the trough and delivered into the channels $a'$.

The cylinder is shown operated by a motor E, mounted on one of the carriage-frames $d$, and connected by worm and worm-wheel E' with the conveyer-shaft $s'$ in the trough $f$, and the farther end of such conveyer shaft is connected by suitable gearing with a cross-shaft D mounted in bearings D' upon the other frame $d$ to rotate the turning cylinder and propel the carriage. The shaft D is connected by worm $u$ and worm-wheel $u'$ with a shaft $t$ carrying pinions $t'$ which mesh with rack-teeth $t^2$ upon the tops of the walls, the shaft $t$ being journaled in the frames $d$ and extending between the same through the disks $g$, $g'$. The cylinder is rotated by a ring-gear $m$ having internal teeth, which is driven by a cog-wheel $m'$ upon a gear-shaft I. This shaft carries a worm-wheel $v$ driven by a worm $v'$ upon the cross-shaft D.

The ring-gear $m$ is mounted upon the end head $h$ of the cylinder, so as to slide thereon through an arc of about twenty degrees, which movement occurs when the rotation of the ring-gear $m$ is reversed, as hereinafter described, to reverse the rotations of the cylinder. This motion of the ring-gear is utilized to automatically reverse the position of the vanes, by the engagement of the studs $n$ with the rocker-arms $l$, causing the shifting of the rocker-arms and the vanes, as already described in reference to Fig. 3. The margin of the ring-gear $m$ is guided as indicated in Fig. 2, by rabbeted gibs $m^2$, and the movement of the ring-gear is limited by the movement of the studs $n$ in the slotted arms $l$, and by the contact of the shells of the vanes with the peripheries of the heads $h$, as shown in Fig. 4. The reversal of the movement of the ring-gear $m$ thus operates first to turn the ring-gear upon the head and reverse the vanes and thereafter to propel the ring-gear and cylinder as a unit.

The rotation of the shaft $s'$ requires to be continuous in one direction, so that the conveyer $s$ may always deliver the grain toward the ends of the trough, but to reverse the rotations of the cylinder and its movement between the walls $a$, the conveyer-shaft $s'$ is provided with a bevel-gear $s^2$ upon its end which meshes with bevel-gears F and F' upon the cross-shaft D, turning such gears in opposite directions. The gears F and F' are fitted with sleeves to turn loosely upon the cross-shaft D, each sleeve having a clutch-plate $b'$. Clutch-hubs $b^2$ are splined to the cross-shaft and may be thrown alternately into engagement with the bevel-gears F and F', by lever-arms $w$ and a handle $w'$. The shifting of this handle serves to reverse the rotations of the cross-shaft D and consequently the rotary movement of the cylinder and the motion of the carriage upon the walls, and such shifting may be effected automatically near the ends of the malting alley, by a suitable dog indicated one at each side of the cylinder at $w^2$ in Fig. 3. The left hand dog, by contact with the handle, shifts it sufficiently to retract the clutch from the clutch-plate of the bevel-gear F and engage the opposite clutch with the clutch-plate of the gear F′. One of the dogs would, in practice, be fixed upon the wall or ceiling adjacent to each end of the alley which the carriage is designed to traverse, and the carriage would thus be driven back and forth upon such alley so long as the power was applied. The handle $w'$, as shown in Fig. 2, projects farther from the end of the cylinder than any of the other parts, and the dog designated $w^2$ in Fig. 2 could thus operate such lever without interfering with the handle $q'$ or any other part upon the carriage.

When the grain is sufficiently malted, the carriage and turning-cylinder may be run from the track $b$ to rails $b'$ upon the transverse cradle shown in Figs. 1 and 12, which is formed with side-beams G and end-beams G′. The beams G carry track-wheels H journaled thereon to fit transverse track-rails I′ upon the floor across the ends of adjacent alleys. The beams G′ have rails $b'$ thereon which, when the cradle is set at the end of an alley, form extensions of the rails $b$ upon the walls $a$ of the alley, so that the carriage with the turning cylinder may be wheeled on to the cradle and moved to the end of another alley. When thus moved, it may be shifted upon the track-rails $b$ of such alley and operated thereon in the manner already described.

In Fig. 2, the walls $a$ are shown hollow with apertures $y$ next the alley for discharging a heating or cooling fluid into the grain while the turning cylinder is agitating the grain. Air or water, either hot or cold, or steam, may thus be supplied to the grain. Pipes $y'$ are shown extended into the chambers within the walls $a$, and suitable connections may be made to such pipes for supplying the fluid as required.

Figures 5, 6, 7, 8:
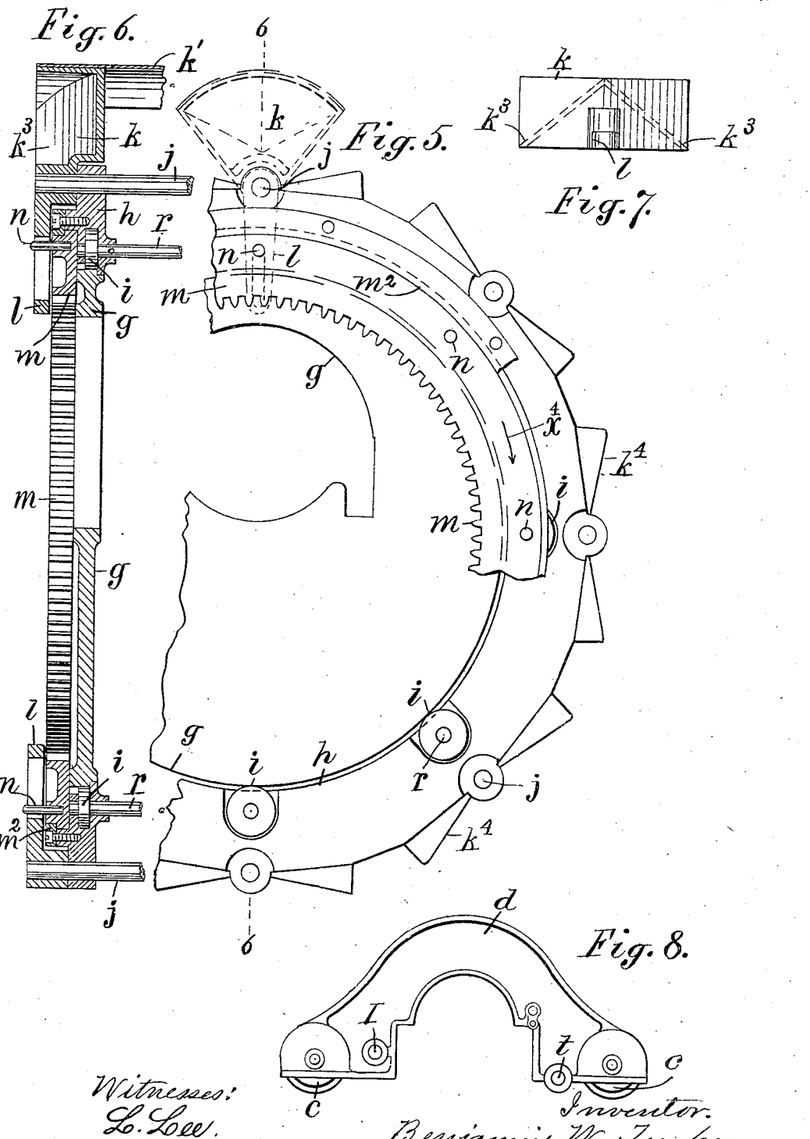
Fig. 5 is an end view of the cylinder-head and supporting-disk.
Fig. 6 is a section on line 6—6 in Fig. 5.
Fig. 7 shows the lower end of one of the heads of the vane-shell.
Fig. 8 shows on a reduced scale one of the carriage-frames.

It will be noticed by reference to the left hand end of the cylinder, which is shown in section in Fig. 2, that the openings $o^2$ to which the grain is discharged from the vanes to the trough $f$ cannot extend to the ends of the cylinder; and in order that the grain lifted by the vanes may be fully discharged into such openings, the heads $k$ of the vanes are formed as with a double inclined surface with the apex at the inner side of the head, as shown in Fig. 7, the ends of such inclined surfaces forming scrapers $k^3$ which move close to the walls $a$ of the malting-floor and thus clean the grain effectively therefrom. Tapering blocks $k^4$ shown in Figs. 2, 3, and 5, are formed upon the heads $h$ at the opposite ends of the openings $o^2$, against which blocks the sloping edges of the heads $k$ rest, as shown in Fig. 3, when the vanes are in their operative position; thus holding the grain away from the rear edge of the vane and throwing toward the openings $o^2$ the grain which is lifted by the forward edge of the head.

A trolley or flexible conductor may be used to convey the current to the electric motor, but any other power beside an electric motor may be used to actuate the turning cylinder.

Having thus set forth the nature of the invention what is claimed herein is:

1. In a turning cylinder for malt turning apparatus, the combination, with an annular cylinder, of a stationary center supporting the same, and vanes secured upon the annular cylinder to operate at its periphery for lifting the grain.

2. In a turning cylinder for malt turning apparatus, the combination, with an annular cylinder, of a stationary center for supporting the same and reversible vanes pivoted upon the annular cylinder and adapted to pick up the grain at the periphery of the cylinder when rotated in opposite directions.

3. In a turning cylinder for malt turning apparatus, the combination, with an annular cylinder, of a stationary center supporting the same and reversible vanes pivoted upon the annular cylinder and adapted to pick up the grain at the periphery of the cylinder when rotated in opposite directions, and means operating automatically when the rotation of the cylinder is reversed, for reversing the said vanes.

4. In a malt turning cylinder, the combination, with a revolving cylinder, of vanes operating upon the periphery of the cylinder to pick up the grain and arranged to discharge it to the interior of the cylinder, and means within the cylinder for discharging the grain at the end into an adjacent receiving channel.

5. In a turning cylinder for malt turning apparatus, the combination, with an annular cylinder, of beams extended through the same with disks fitted to support the annular cylinder, a trough supported upon the beams inside the cylinder, and vanes secured upon the annular cylinder for lifting the grain, with openings at the inner ends of the vanes to discharge the grain into the said trough.

6. In a turning cylinder for malt turning apparatus, the combination, with an annular cylinder, of beams extended through the same with disks fitted to support the annular cylinder, a trough supported upon the beams inside the cylinder, and vanes secured upon the annular cylinder for lifting the grain, with openings at the inner ends of the vanes to discharge the grain into the said trough, and means for holding the openings continuously closed to retain the grain in the vanes when turning the malt over and over.

7. In a turning cylinder for malt turning apparatus, the combination, with an annular cylinder, of beams extended through the same with disks fitted to support the annular cylinder, a trough supported upon the beams inside the cylinder, and vanes secured upon the annular cylinder for lifting the grain with openings at the inner ends of the vanes and movable plates with mechanism for operating the plates to close the openings and hold the grain in the vanes until over the trough.

8. In a malt turning apparatus, a carriage with wheels to support the same movably and having frames at its opposite ends with beams connecting the said frames, disks supported upon the said frames, an annular cylinder mounted to rotate upon the disks and provided with stirring vanes, and means for automatically reversing the vanes when the rotation of the cylinder is reversed upon the carriage.

9. In a malt turning apparatus, a carriage with wheels to support the same movably and having frames at its opposite ends with beams connecting the said frames, disks supported upon the said beams, annular cylinder-heads fitted to turn thereon, vane-shafts extended between the heads, segmental vanes fitted to the said shafts with an arm connected to each vane, and means connecting the said arms for reversing the said segmental vanes when required.

10. In a turning cylinder for malt turning apparatus, the combination, with an annular cylinder having annular heads and longitudinal openings upon its periphery with bridges between such openings, of reversible vanes pivoted over the openings, valve-plates pivoted in the openings each having a pinion $p'$ to turn the same, a shaft $r$ adjacent to each valve-plate, a segment upon such tie-bar meshing with the said pinion, means for holding the segment and valve-plate in a central position and adapted to yield when pressed in either direction, a crank attached to each segment and a cam for moving the cranks at a given point in the rotations of the cylinder to tip the said valve-plate, as and for the purpose set forth.

11. In a turning cylinder for malt turning apparatus, the combination, with an annular cylinder having annular heads and longitudinal openings upon its periphery with bridges between such openings, of reversible vanes pivoted over the openings, valve-plates pivoted in the openings each having a pinion $p'$ to turn the same, a shaft $r$ adjacent to each valve-plate, a segment upon such shaft meshing with the said pinion, means for holding the segment and valve-plate in a central position and adapted to yield when pressed in either direction, means for traversing the cylinder in a malting alley and for reversing its movement and its rotations, means connected with the cylinder reversing mechanism for reversing the position of the vanes and a cam with means for moving it into the path of the segment cranks to thereby rock the valve-plates and discharge the contents of the vanes successfully when desired.

12. In a malt turning apparatus having a malting alley with walls at its opposite edges, the combination, with a carriage movable upon the walls, of a stationary center supported upon the carriage, an annular cylinder rotatable thereon, segmental vanes $k'$ pivoted upon the said cylinder and extending from one end to the other of the cylinder and having heads $k$ sloped outwardly at both edges to scrape the grain from the walls of the alley.

13. In a turning cylinder for malt turning apparatus, the combination, with a stationary center, of an annular cylinder rotatable thereon with longitudinal openings in the cylinder and bridges connecting the cylinder heads between said openings, valve-plates pivoted between the bridges to wholly close the periphery of the cylinder, reversible vanes pivoted upon the cylinder with heads $k$ sloped outwardly at both edges to scrape the grain from the walls of the alley, and wedge-shaped blocks $k^3$ at the ends of the longitudinal openings fitted to the inner sloping faces of the heads $k'$.

14. In a turning cylinder for malt turning apparatus, the combination, with a stationary center, of an annular cylinder rotatable thereon with longitudinal openings in the cylinder and bridges connecting the cylinder-heads between said openings, valve-plates pivoted between the bridges to wholly close the periphery of the cylinder, and reversible vanes pivoted upon the cylinder over said valve-plates.

15. In a turning cylinder for malt turning apparatus, the combination, with a stationary center, of a cylinder having annular heads rotatable upon the center and having longitudinal openings in its periphery with bridges extended between the openings, vane-shafts extended between the heads in the said openings with reversible vanes thereon, valve-plates pivoted in the openings upon the vane-shafts and each provided with a toothed pinion $p'$, a shaft $r$ between the cylinder heads adjacent to each of the valve-plates with segment $p$ journaled thereon and meshing with the pinion $p'$, the segment having hub with tooth $r^2$ thereon at each end, the collars $r^5$ having each the lug $r^4$ to engage the teeth $r^2$ in opposite directions, springs $r'$ operating to turn the collars $r^5$ in opposite directions, and each collar having a slot and pin to limit the movement of the lug $r^4$ and hold the segment normally in a central position.

16. In a malt turning apparatus, a carriage with wheels to support the same movably and having frames at its opposite ends with beams connecting the said frames, disks supported upon the said beams with a trough extended through the said disks and beyond the frame of the carriage, annular cylinder-heads fitted to turn upon the disks, vane-shafts extended between the heads, segmental vanes fitted to the said shafts with an arm connected to each vane, means connecting the said arms for reversing all the said vanes simultaneously when required, plates pivoted upon the vane-shafts for closing the inner ends of the vanes, a crank-shaft adjacent to each of the vane-shafts with gearing operating to rock the said plates, and a cam with means for moving it by hand into the path of the said cranks when over the trough, whereby the grain may be retained in each vane until discharged into the trough.

17. In a malt turning apparatus, a malting alley with side-walls for retaining the grain, a receiving trough adjacent to one of such walls, a carriage with wheels fitted to roll upon the said walls and having frames at its opposite ends with beams connecting the said frames, disks supported upon the said beams, a trough extended through the disks and over the adjacent channel, an annular cylinder mounted to rotate upon the disks and provided with stirring vanes, means for retaining the grain in the vanes when turning the malt over and over, and means for discharging the grain from the vanes into the said trough, with a conveyer in the cylinder to shift such grain to the adjacent channel.

18. In a malt turning apparatus, a malting alley having hollow side-walls for retaining the grain with apertures discharging from the wall toward the grain, means for supplying heating or cooling fluid to the interior of the walls, a carriage traversed upon the walls and a stirring cylinder rotated upon the carriage for stirring the grain between the walls.

19. In a malt turning apparatus, a carriage with wheels to support the same movably and having frames at its opposite ends with beams $e$ connecting the said frames, and a malt turning cylinder comprising disks $g$ supported upon the said beams, annular cylinder-heads $h$ connected by tie-bars $h^2$ having wheels $i$ fitted to the peripheries of the disks, flanges $h'$ fitted to the sides of the disks to prevent longitudinal movement, and vanes mounted upon the periphery of the cylinder for turning the grain.

20. In a malt turning apparatus, the combination, with a malting alley having side-walls for retaining the grain and a channel $a'$ adjacent thereto with conveyer $a^2$ therein, of a carriage traversed upon the walls comprising frames $d$ with beams $e$ connecting the same, disks supported upon the beams, an annular cylinder mounted to rotate upon the disks, a trough supported upon the beams inside the cylinder with spout and hood extended over the channel $a'$, a conveyer within the trough for discharging the grain to the channel, vanes secured upon the annular cylinder for turning and lifting the grain, the cylinder having openings within the vanes to discharge the grain into said trough, and valve-plates closing said openings with mechanism for tipping the valve-plates when over the trough to discharge the grain from the vanes thereto whereby the grain may be stirred until it is malted and then transferred from the alley to the channel $a'$.

21. In a malt turning apparatus, the combination, with a malting alley having side-walls for retaining the grain and a channel $a'$ adjacent thereto with conveyer $a^2$ therein, of a carriage traversed upon the walls comprising frames $d$ with beams $e$ connecting the same, disks supported upon the beams, an annular cylinder mounted to rotate upon the disks, a trough $f$ supported upon the beams inside the cylinder with spout and hood $f'$ extended over the channel $a'$, a conveyer $s$ within the trough having shaft $s'$ extended outwardly through the hood, means for rotating such conveyer while the carriage is traversing the alley, and a gear-plate G upon the hood with gearing operated by the conveyer-shaft to traverse the carriage upon the walls of the alley and to rotate the turning cylinder reversibly upon the carriage.

22. In a malt turning apparatus, the combination, with a malting alley having side-walls for retaining the grain and channels $a'$ at opposite sides of the alley with conveyers $a^2$ therein, of a carriage traversed upon the walls comprising frames $d$ with beams $e$ connecting the same, disks supported upon the beams, an annular cylinder mounted to rotate upon the disks, a trough $f$ supported upon the beams inside the cylinder with spout and hood $f'$ extended beyond the frame $d$ over the channels $a'$, a conveyer $f$ within the though having shaft $s'$ extended outwardly through both of the hoods, an electric motor mounted upon both of the hoods with connections to rotate the conveyer-shaft, a gear-plate G upon the other hood with gearing operated by the conveyer-shaft to propel the carriage and to rotate the turning cylinder, and electric connections for operating the electric motor.

23. In a malt turning apparatus, the combination, with a malting alley having side-walls for retaining the grain, such walls having track-rails and toothed racks upon the top, of a carriage comprising frames $d$ with beams $c$ connecting the same, disks supported upon the beams, an annular cylinder movable upon the disks with vanes to turn the grain, a shaft upon the carriage with means for rotating the same continuously, a traversing shaft $t$ extended across the carriage with pinions at opposite ends meshing with the toothed racks, a cylinder-shaft I extended through the disks, with gearing connected to the cylinder to rotate the same upon the disks and connections from the shaft $s'$ to the traversing shaft and the cylinder-shaft for operating them, substantially as herein set forth.

24. In a malt turning apparatus, the combination, with a malting alley having side-walls for retaining the grain, such walls having track-rails and toothed racks upon the top, of a carriage comprising frames $d$ with beams $e$ connecting the same, disks supported upon the beams, an annular cylinder movable upon the disks with vanes to turn the grain, a shaft upon the carriage with means for rotating the same continuously, a traversing shaft $t$ extended across the carriage with pinions at opposite ends meshing with the toothed racks, a cylinder-shaft I extended through the disks, ring-gears upon the cylinder-heads with pinions upon the cylinder-shaft to drive the same, a cross-shaft D upon the carriage for the reverse gearing with connections to the traversing shaft $t$ and to the cylinder-shaft I, and reversing gears driven by the shaft $s'$ with clutches for connecting the same alternately with the cross-shaft, the clutches having an operating handle $w'$ movable in the direction of the alley and dogs fixed near the ends of the alley to contact with such handle and reverse the clutches to traverse the carriage in opposite directions.

In testimony whereof I have hereunto set my hand in the presence of two subscribing witnesses.

BENJAMIN W. TUCKER.

Witnesses:
THOMAS S. CRANE,
H. J. DORGELOH.